United States Patent
Li (10) Patent No.: US 9,353,793 B1
(45) Date of Patent: May 31, 2016

(54) METHOD AND STRUCTURE FOR IMPROVING THE DYNAMIC CHARACTERISTICS OF A LINEAR ROLLER GUIDEWAY

(71) Applicant: YEONG CHIN MACHINERY INDUSTRIES CO., LTD., Taichung (TW)

(72) Inventor: Wen-Lung Li, Taipei (TW)

(73) Assignee: YEONG CHIN MACHINERY INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 14/615,414

(22) Filed: Feb. 5, 2015

(51) Int. Cl.
*F16C 29/06* (2006.01)
*F16C 29/00* (2006.01)

(52) U.S. Cl.
CPC ........... *F16C 29/0604* (2013.01); *F16C 29/005* (2013.01)

(58) Field of Classification Search
CPC .. F16C 29/0604; F16C 29/005; F16C 29/002; F16C 29/007
See application file for complete search history.

(56) References Cited

U.S. PATENT DOCUMENTS

| 2,352,911 | A | * | 7/1944 | Osplack | F16C 29/04 384/126 |
| 4,773,770 | A | * | 9/1988 | Osawa | B23Q 1/28 384/21 |
| 5,011,300 | A | * | 4/1991 | Teramachi | F16C 29/007 384/25 |
| 5,281,029 | A | * | 1/1994 | Morita | F16C 29/007 384/45 |

* cited by examiner

*Primary Examiner* — Thomas R. Hannon
(74) *Attorney, Agent, or Firm* — Pai Patent & Trademark Law Firm; Chao-Chang David Pai (57) ABSTRACT

A method and structure improves the dynamic characteristics of a linear roller guideway for precision machine tool, robot or automation equipment by: adding a nonlinear component to the linear roller guideway to provide better dynamic stiffness and damping effects. The nonlinear component has a nonlinear contact characteristic of hardening so that during mounting or in a quick movement of the slide units of the linear roller guideway, the nonlinear component has a relatively lower stiffness to reduce its friction with the rail surface; on the other hand, when bearing a load or during a cutting work, the nonlinear component has a relatively higher stiffness. The nonlinear component also provides a planar contact, overcoming the drawbacks of low damping of point or line contact of the slide units of the nonlinear roller guideway, and enhancing the cutting precision of the machine tool.

13 Claims, 8 Drawing Sheets

METHOD AND STRUCTURE FOR IMPROVING THE DYNAMIC CHARACTERISTICS OF A LINEAR ROLLER GUIDEWAY

BACKGROUND OF THE INVENTION (a) Field of the Invention

The present invention relates to linear roller guideway technology, and more particularly to a method and structure for improving the dynamic characteristics of a linear roller guideway for use in a precision machine tool, robotic or industrial automation equipment to provide a linear motion of low frictional resistance and to bear a load.

(b) Description of the Prior Art

Figure 1:
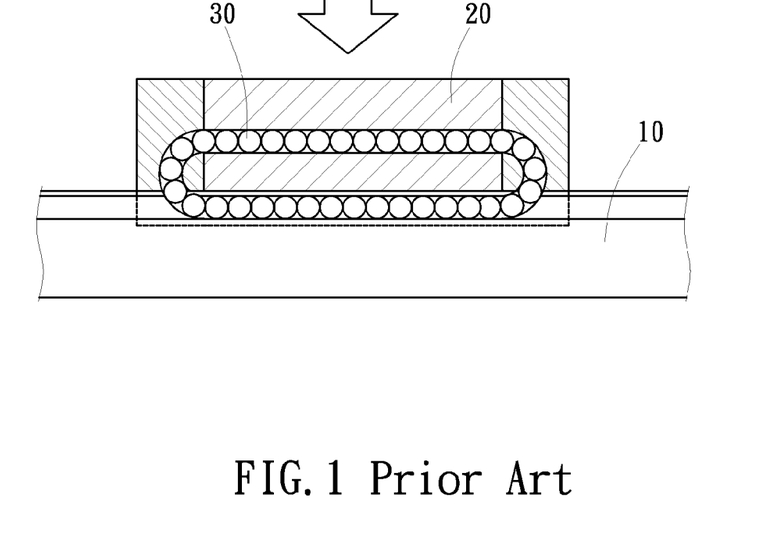
FIG. 1 is a schematic transverse sectional view of a linear roller guideway according to the prior art.

Linear roller guideway is a high precision motion mechanism assembly, as illustrated in FIG. 1, generally comprising a rail 10, at least one slide unit (slider, slide block, or carriage) 20, and rolling elements 30. The slide unit 20 is adapted for holding and carrying work platforms and workpieces. The rolling elements 30 can be balls or rollers. By means of the rolling elements 30, the rail 10 and the slide unit 20 are movable relative to each other to further carry the work platform, achieving a high precision linear motion. Because the contact between the rail 10 and the slide unit 20 is points or a line, the frictional resistance is very low, about 2% of sliding friction, and the coefficient of friction is about 0.004.

Figure 2:
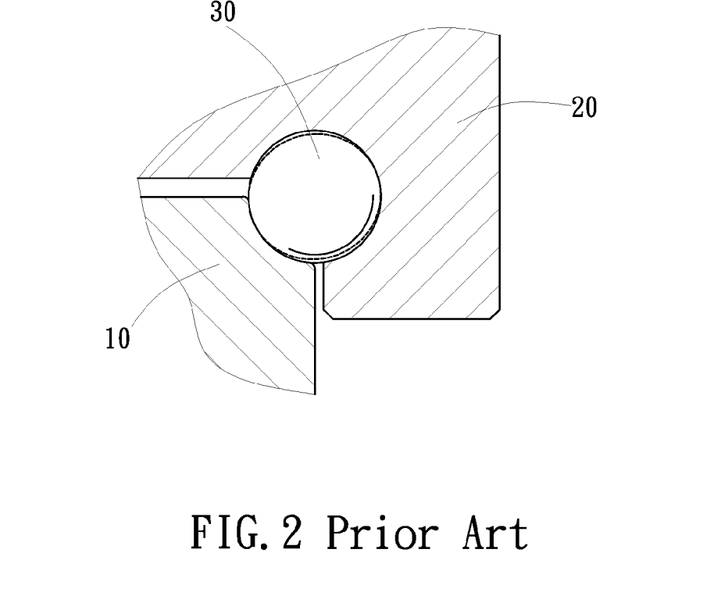
FIG. 2 is a schematic drawing illustrating an elastically deformed status of one rolling element in the linear roller guideway according to the prior art.

According to the theory of elasticity, when an external force is applied to the surface of the slide unit 20, the rolling elements 30 in the linear roller guideway are slightly elastically deformed (see the imaginary line in FIG. 2). This elastic deformation is not a permanent deformation. After the external force disappears, the rolling elements 30 immediately return to their former shape. Thus, if the applied external force varies with time, or the size of the applied external force (e.g. the machine tool cutting force) is changed, a number of negative factors can arise during the elastic deformation process of the rolling elements 30. Therefore, many different design methods or techniques are developed. Throughout these methods or patents, in addition to the method of enabling a controller to actively make compensation, they can be roughly divided into several categories as follows:

(A) Increase the stiffness of the linear roller guideway by: reducing the elastic deformation of rolling elements, for example, changing the geometric size, amount and/or relative allocation of the rolling elements, or pre-stressing the rolling elements.

(B) Increase the damping force of the linear roller guideway by: enabling the elastic deformation of the rolling elements to be rapidly stopped, i.e., rapidly attenuating or stopping the vibration when it is produced, for example, putting a large amount of mini sliding components in between the slide unit and the rail, using high damping materials, or using a hydraulic slide unit having an oil film to provide a high level of damping properties.

(C) Improve the stiffness and damping of the linear roller guideway by: adding an additional nonlinear element. This method is a more progressive way in line with the industry's needs.

SUMMARY OF THE INVENTION

A linear roller guideway needs to provide different functions for matching with the status of a work platform supported on slide units thereof. A work platform for this application generally assesses: (a) translational motion status, and (b) processing status where an external force is applied to the workpiece.

(a) Translational Motion Status:

When moving the work platform, the linear roller guideway needs to provide a function of low frictional resistance so that the work platform can be rapidly moved and quickly positioned in position. In this status, the contact between the rail and rolling elements of the linear roller guideway and the contact between the rolling elements and slide units of the linear roller guideway are preferably of point or line contact to meet the requirement of low frictional resistance.

(b) Processing Status:

In this status, the work platform stands still or is moved at a low speed. Under this condition, the feature of low friction resistance is not the main requirement for the linear roller guideway; on the contrary, the linear roller guideway needs to provide a function of high stiffness at this time, preferably a stiff structure for giving a support to minimize the deformation of the linear roller guideway.

If the workpiece machining precision requirement is not high, commercial linear roller guideways can meet the engineering requirements. However, if the workpiece machining precision requirement is high, surface contact hard rails such as V-rails or dovetail rails are still widely used in commercial and industrial linear roller guideways for the reason that they can provide high stiffness to lower the effects caused by deformation. In order to compensate for the drawback of insufficient stiffness of a linear roller guideway during a cutting work, the invention provides a nonlinear component for mounting on a rail of a linear roller guideway between two slide units to meet the requirements for the aforesaid two work platform statuses.

However, simply adding a surface contact nonlinear component to the linear roller guideway can cause a problem of increased frictional resistance during a quick movement of the work platform. Further, the hard contact between the nonlinear component and the rail of the linear roller guideway imparts a barrier to the installation. In order to solve this problem, the invention designs the contact surface relationship between the nonlinear component and the rail to have a nonlinear contact characteristic of hardening so that the contact between the nonlinear component and the rail becomes a soft contact or contact with less stiffness in the mounting procedure or during a translational motion, and a hard contact during a cutting work.

Thus, adding a nonlinear component constructed in accordance with the present invention to a linear roller guideway achieves the effect of improving the stiffness and damping of the linear roller guideway as described in the aforesaid category (C) of improvement measure. Further, it can be seen from the above description that a linear roller guideway having a relatively higher stiffness will produce a relatively smaller amplitude of vibration, and thus, the damping force required for eliminating the vibration can be relatively smaller, or, the vibration can be eliminated more quickly.

DETAILED DESCRIPTION OF THE PREFERRED EMBODIMENTS

Figure 3:
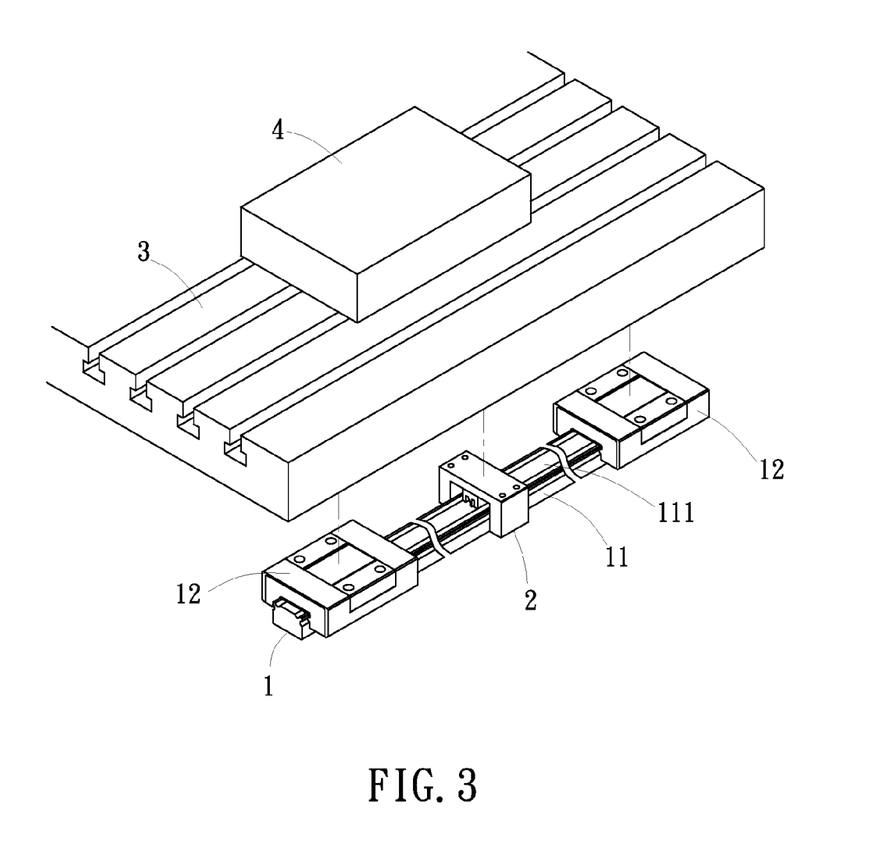
FIG. 3 is a schematic drawing of a nonlinear component mounted in a linear roller guideway in accordance with the present invention.

Referring to FIG. 3, the invention provides a method and a structure for improving the dynamic characteristics of a linear roller guideway comprising a rail 11, a plurality of slide units 12, and rolling elements (not shown) set in between the rail 11 and each slide unit 12. The method is to slidably mount a nonlinear component 2 on the rail 11 between each two adjacent slide units 12, allowing the nonlinear component 2 and the slide units 12 to concomitantly carry a vertical load generated by a work platform 3 and/or a workpiece 4.

The invention particularly designs the aforesaid nonlinear component 2 to have a nonlinear contact characteristic of hardening so that when mounting the nonlinear component 2 on the rail 11 or when the nonlinear component 2 carries no load, the contact between the nonlinear component 2 and the rail 11 can be a soft contact or a contact with less stiffness; when an external force is applied to the work platform 3 and/or the workpiece 4, the nonlinear component 2 is capable of providing an effect of high stiffness. The so-called "nonlinear contact characteristic of hardening" means that the nonlinear component 2 can provide a hardening support surface against the increasing vertical load of the work platform 3. Thus, when the vertical load of the work platform 3 is gradually reduced, the surface of contact between the nonlinear component 2 and the rail 11 will be gradually softened. On the contrary, when the vertical load of the work platform 3 is increased, the surface of contact between the nonlinear component 2 and the rail 11 will be relatively hardened to increase the stiffness of the nonlinear component 2 for support between the work platform 3 and the rail 11, enabling the nonlinear component 2 to achieve the expected effect.

Figure 4:
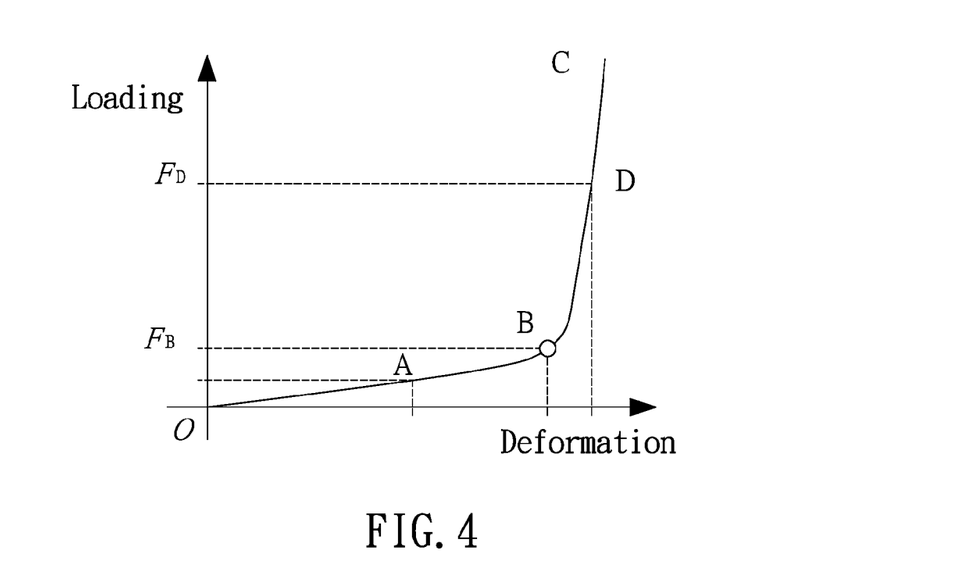
FIG. 4 is a surface contact stiffness curve having a nonlinear contact characteristic of hardening required according to the present invention.

Referring to FIG. 4, the nonlinear contact characteristic of hardening of the nonlinear component is the slope of the OBC curve shown in the drawing, where Point B is the reversal point or cut-off point between the high stiffness region and the low stiffness region. During the installation of the linear roller guideway after the mounting of the nonlinear component 2 or during a platform movement status, no force processing is performed. At this time, the total load is relatively smaller, or should be below $F_B$, and thus, the nonlinear component 2 provides the OB section of low stiffness. Assume that the stiffness in this OB section is $k_{S,OB}$, the rolling stiffness of one single slide unit 12 is $k_R$, $k_R \gg k_{S,OB}$, and the work platform 3 is supported on two linear roller guideways in each direction (four slide units, two nonlinear components), in this case, the total equivalent static stiffness $k_{eq}$ can be expressed by:

$$k_{eq}^{(1)} = 4k_R + 2k_{S,OB} \approx 4k_R \quad (1)$$

In other words, the increased stiffness after adding the nonlinear component 2 is negligible, and the linear roller guideway still only presents the original stiffness of the slide units 12 (see FIG. 1), maintaining the function of low frictional resistance.

On the other hand, if is processing load is $(F_D - F_B)$ or the total load is $F_D$ during a cutting operation, then, as expressed by the characteristic curve in FIG. 4, the stiffness in the BC section is rapidly increased with the change of the amount of elastic deformation or load. Assume the stiffness in the BC section in the cutting operation is $k_{S,BC}$ wherein $k_{S,BC} \gg k_{S,OB}$ and $k_{S,BC} > k_R$, thus, the total equivalent static stiffness $k_{eq}$ can be expressed by:

$$k_{eq}^{(2)} = 4k_R + 2k_{S,BC} \quad (2)$$

In other words, in addition to the original stiffness of the slide units 12, the linear roller guideway has the stiffness of the nonlinear component 2 in the BC section added thereto.

Further, unlike the slide units 12, the nonlinear component 2 essentially provides a planar contact, and the friction between the nonlinear component 2 and the rail 1 is a sliding friction (kinetic friction), thus, the oil film of the applied lubricant and this sliding friction can increase the damping effect of the nonlinear component 2 in the OB section and the BC section. The above description explains the theoretical correctness and inventive step of the present invention.

For better understanding of the present invention, the method for improving the dynamic characteristics of a linear roller guideway is explained hereinafter by way of the following preferred embodiment. According to this preferred embodiment, the method for improving the dynamic characteristics of a linear roller guideway comprises the steps of:

Step I: Establish a Surface Contact Having a Nonlinear Contact Characteristic of Hardening.

In this step, as described above, establish a curve for a surface contact having the said nonlinear contact characteristic of hardening (see FIG. 4). This curve can be presented in any of a variety of forms that satisfy the nonlinear contact characteristic of hardening as defined according to the present invention.

Figure 5:
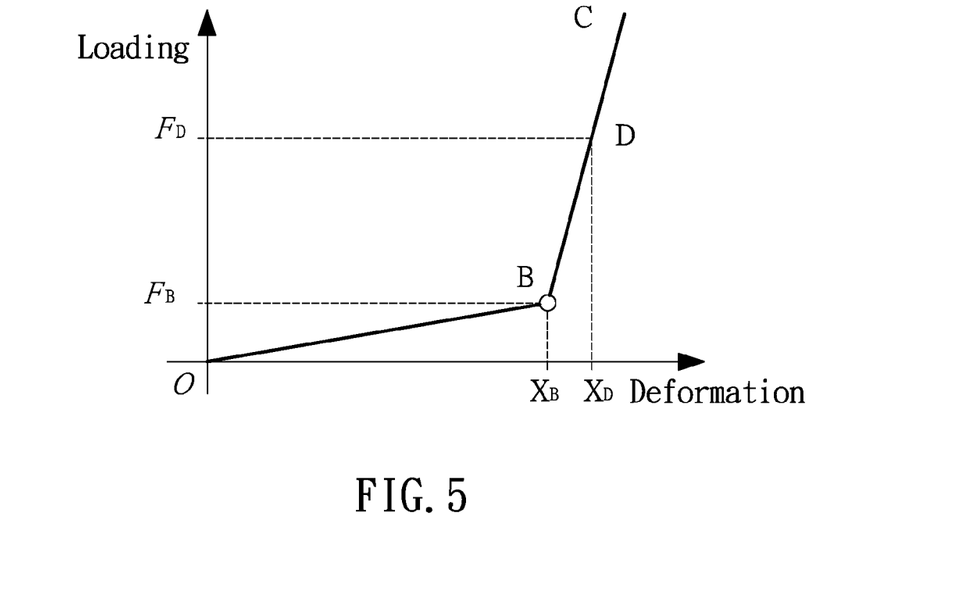
FIG. 5 illustrates the surface contact stiffness curve of FIG. 4 simplified into a curve of bilinear contact.

Let the load and amount of deformation of the surface contact between the nonlinear component 2 and the rail 11 satisfy the linearly increasing characteristic; thus, simplify the relationship between the OB section (namely, the low stiffness region) and the BC section (namely, the high stiffness region) to a relationship between two straight lines, thus, as illustrated in FIG. 5, the nonlinear component defined between the OB section and the BC section is composed of two straight lines, i.e., nonlinear or the so-called "bi-linear", as shown in FIG. 5, and thus, the stiffness of the OB section and the stiffness of the BC section in the nonlinear component 2 are respectively the slopes of the two straight lines, and therefore, $k_{S,OB}$ and $k_{S,BC}$ in the formula (1) and formula (2) are constants, and, the values of these two constants determine the stiffness value of the nonlinear component in the low stiffness region and the high stiffness region.

Step II: Establish the Stiffness of the High Stiffness Region and the Stiffness of the Low Stiffness Region.

In this step, calculate the stiffness of the nonlinear component in the OB region and the BC region according to the results obtained from Step I and shown in FIG. 5, and let the load and the amount of deformation to be F and x respectively, and thus, the stiffness of the nonlinear component in the OB region and the stiffness of the nonlinear component in the BC region shown in FIG. 5 can be respectively obtained as:

$$k_{S,OB} = \frac{F_B}{x_B} \quad (3)$$

And $$k_{S,BC} = \frac{F_D - F_B}{x_D - x_B} \quad (4)$$

Step III: Design a Nonlinear Component.

Design the nonlinear component 2 to have a low stiffness region, and a high stiffness region having a stiffness higher than the low stiffness region, wherein the low stiffness region will elastically deform when bearing the vertical load of the aforesaid work platform 3 and/or workpiece 4; the high stiffness region approaches the rail surface 111 of the rail 11 of the linear roller guideway 1 with the deformation of the low stiffness region, and comprises a contact surface for directly or indirectly abutting against the rail surface 111.

The contact surface of the high stiffness region can be made in any of a variety of forms that satisfy the nonlinear contact characteristics of the bilinear sections shown in FIG. 5. Further, the nonlinear component 2 is not limited to geometric or material nonlinear stiffness, however, in this embodiment, geometric nonlinearity is explained to support the effectiveness of the present invention.

Figure 6:
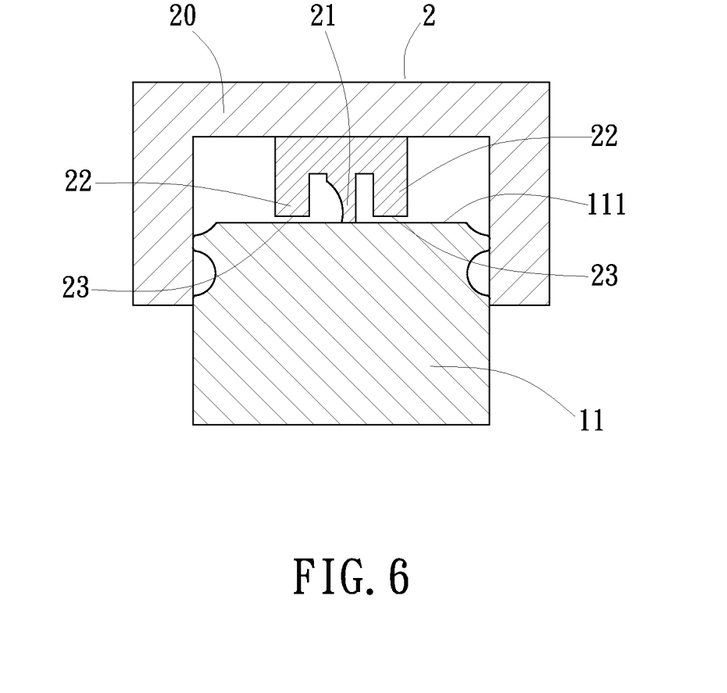
FIG. 6 is a schematic sectional view of a nonlinear component in accordance with a first embodiment of the present invention.
Figure 7:
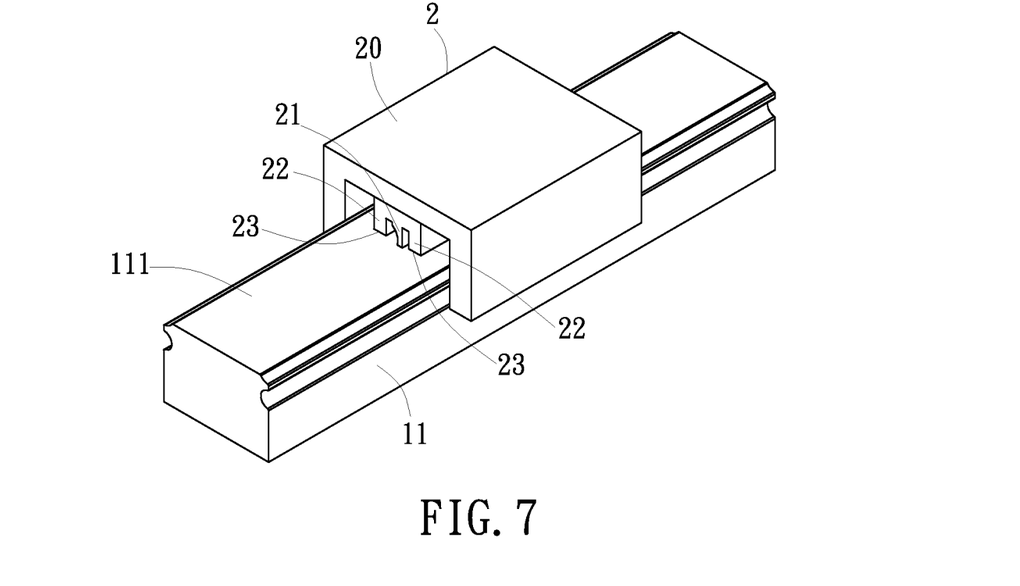
FIG. 7 is an oblique top view illustrating the nonlinear component of the first embodiment of the present invention mounted on a rail for a linear roller guideway.
Figure 8:
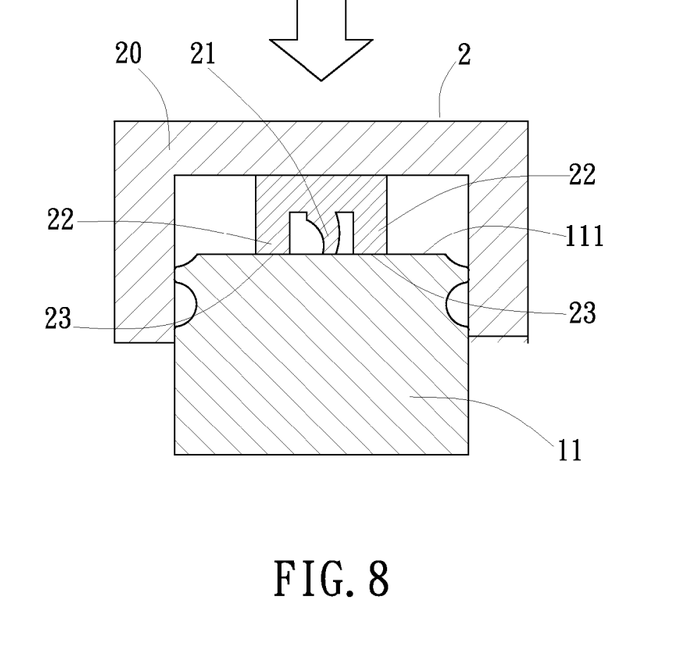
FIG. 8 is a schematic drawing illustrating a stiff support status of the nonlinear component of the first embodiment of the present invention.

FIG. 6 is a schematic sectional view of a nonlinear component 2 that satisfies the stiffness curve shown in FIG. 4. FIG. 7 illustrates the nonlinear component 2 mounted on a rail 11. When a vertical load is transferred from the aforesaid work platform 3 and/or workpiece 4 to the nonlinear component 2 through a jacket 20 of the nonlinear component 2, the middle low stiffness region 21 of the nonlinear component 2 receives the weight of the vertical load at first and is caused to elastically gradually deform, the stiffness of this low stiffness region 21 is the stiffness value of $k_{S,BC}$ obtained in Step II, and, the amount of deformation is determined according to the amount of the vertical load. When the amount of deformation surpasses the predetermined amount of deformation $x_B$, the contact surfaces 23 of the high stiffness regions 22 at opposing left and right sides relative to the low stiffness region 21 will be forced into contact with the rail surface 111 (see FIG. 8), increasing the stiffness to the level of the high stiffness region to achieve the surface contact characteristic of nonlinearity or bilinearity.

Figure 9:
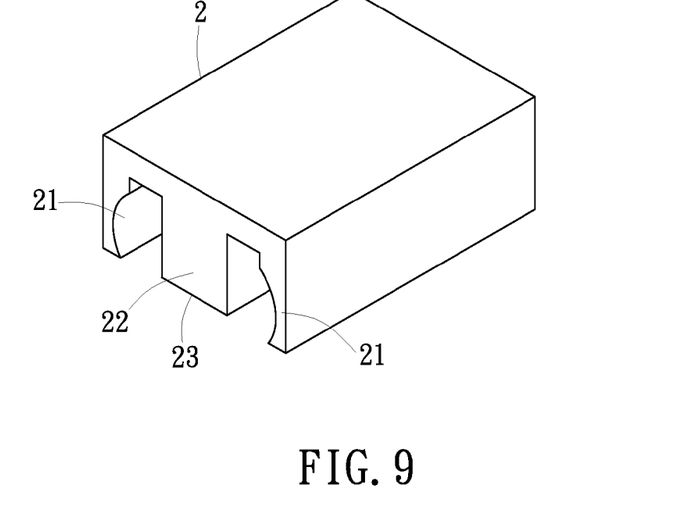
FIG. 9 is an oblique top view of a nonlinear component in accordance with a second embodiment of the present invention.

FIG. 9 illustrates an alternate form of the nonlinear component 2. According to this second embodiment, the nonlinear component 2 comprises two low stiffness regions 21 respectively disposed at opposing left and right sides, and a high stiffness region 22 located on the middle between the two low stiffness regions 21. This high stiffness region 22 comprises a contact surface 23 adapted for contacting the rail surface 111 to achieve the same effects as the aforesaid first embodiment.

Step IV: Mount the Nonlinear Component.

As illustrated in FIG. 3, slidably mount the nonlinear component 2 thus prepared on a rail 11 of a linear roller guideway 1 between two slide units 12 of the linear roller guideway 1 to have one wall (for example, the top wall of the nonlinear component 2) be joined to a work platform 3, enabling the nonlinear component 2 and the slide units 12 to concomitantly bear the vertical load of the work platform 3 and/or a workpiece 4.

Figure 10:
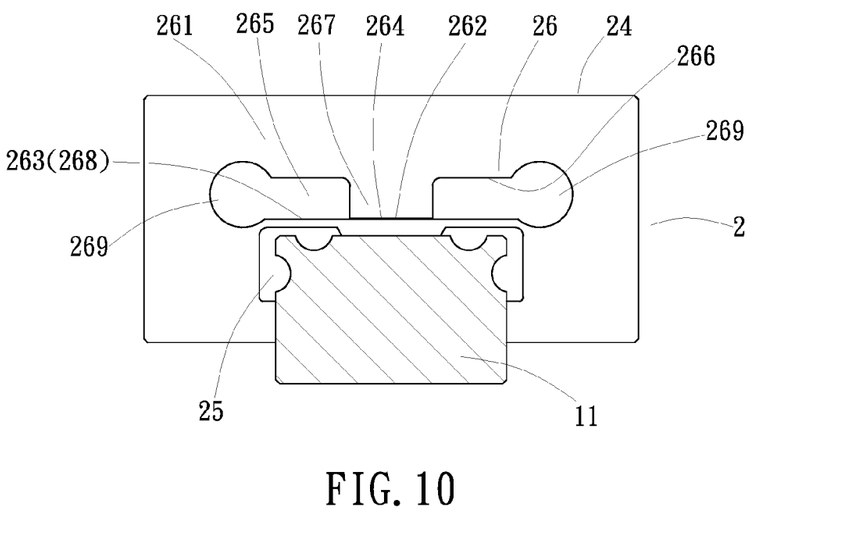
FIG. 10 is a schematic drawing illustrating a nonlinear component of a third embodiment of the present invention mounted on a rail for a linear roller guideway.
Figure 11:
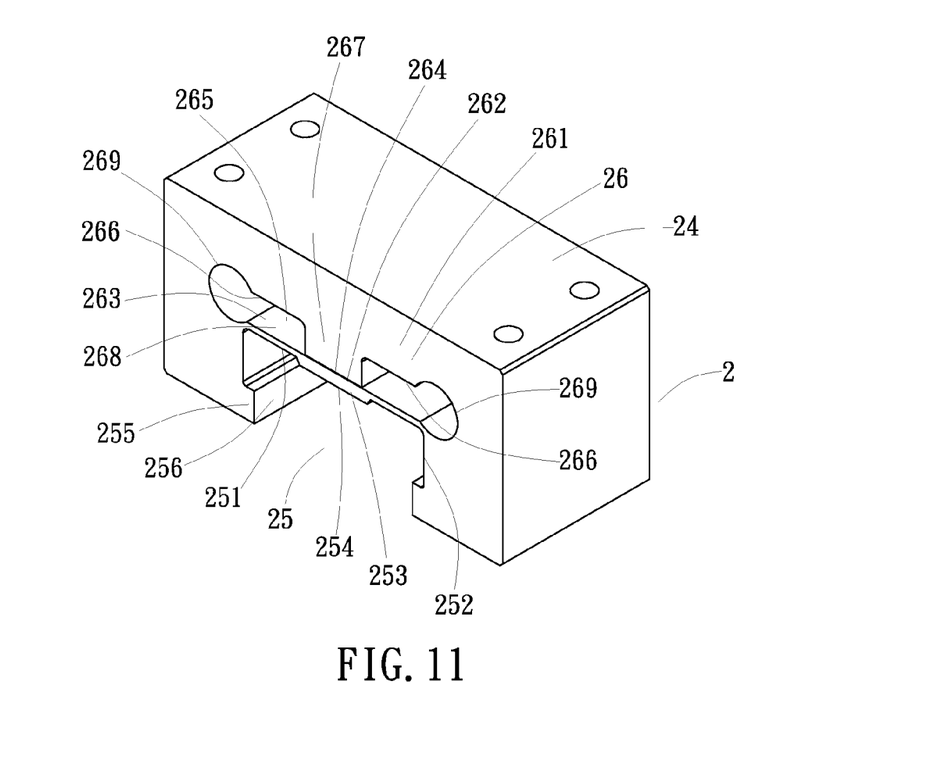
FIG. 11 is an oblique top view of the nonlinear component of the third embodiment of the present invention.
Figure 12:
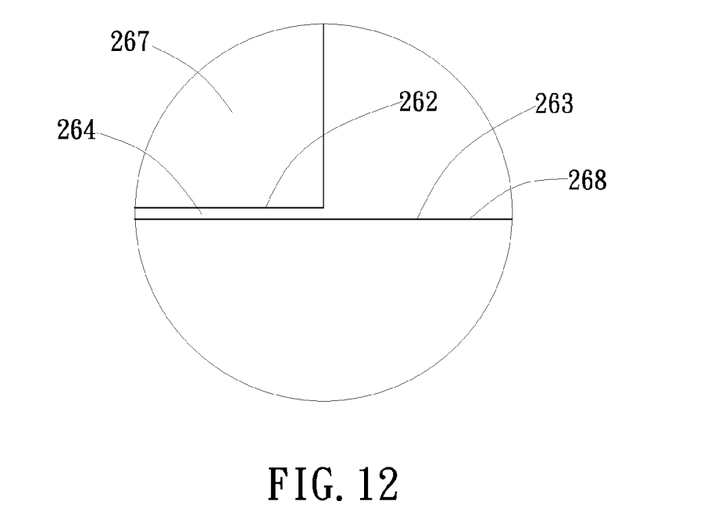
FIG. 12 is a schematic drawing illustrating an allowable clearance defined between the high-stiffness first support surface and the high-stiffness second support surface in the nonlinear component of the third embodiment of the present invention.

Referring to FIG. 10 and FIG. 11, a nonlinear component 2 for improving the dynamic characteristics of a linear roller guideway in accordance with a third embodiment of the present invention is shown. According to this third embodiment, the nonlinear component 2 is a rectangular metal block, comprising a bearing surface 24 located at a top side thereof for joining to a bottom surface of the work platform 3 (see FIG. 3), sliding groove 25 located in an opposing bottom side thereof and extending through opposing front and rear sides thereof and fitting the aforesaid linear roller guideway 1 (rail 11) and a hardening contact structure 26 located between the bearing surface 24 and the sliding groove 25. This hardening contact structure 26 specifically comprises at least one low-stiffness deformable portion 261 for bearing a vertical load from the bearing surface 24, a high-stiffness first support surface 262 capable of bearing the vertical load from the bearing surface 24 and downwardly movable with the loading of the vertical load, a high-stiffness second support surface 263 corresponding to the high-stiffness first support surface 262, and an allowable clearance 264 defined between the high-stiffness first support surface 262 and the high-stiffness second support surface 263 (see FIG. 12). This allowable clearance 264 is preferably in the range of 0.05 mm~0.1 mm.

Referring to FIGS. 10 and 11 again, the hardening contact structure 26 of the nonlinear component 2 further comprises a pass-through portion 265 in the form of, for example, a slot that extends through the opposing front and rear sides of the nonlinear component 2 and defining an inner top wall 266 and an opposing inner bottom wall 268 that forms the aforesaid high-stiffness second support surface 263, a first protruding block 267 downwardly extending from the inner top wall 266 of the pass-through portion 265 and terminating in the aforesaid high-stiffness first support surface 262, and two circular through holes 269 respectively disposed in the opposing left and right sides of the pass-through portion 265 in communication with the pass-through portion 265. The diameter of the through holes 269 is larger than the height between the inner top wall 266 and the inner bottom wall 268 of the pass-through portion 265 so that the thickness of the part between the through holes 269 and the bearing surface 24 is smaller than the thickness of the part between the inner top wall 266 and the bearing surface 24. Thus, the part between the through holes 269 and the bearing surface 24 and the part between the inner top wall 266 and the bearing surface 24 form the aforesaid low-stiffness deformable portion 261. When the bearing surface 24 bears a vertical load, the low-stiffness deformable portion 261 is forced to deform, moving the high-stiffness first support surface 262 into abutment against the high-stiffness second support surface 263.

Referring to FIGS. 10 and 11 again, the aforesaid sliding groove 25 preferably comprises a top groove wall 251, two opposing side groove walls 252, a second protruding block 253 downwardly extending from the top groove wall 251, and two third protruding blocks 255 respectively extending from the two side groove walls 252 toward a vertical midline of the groove 25. The second protruding block 253 comprises a first sliding surface 254 located at a bottom side thereof and kept in contact with the top surface of the rail 11 of the linear roller guideway 1. Each third protruding block 255 comprises a second sliding surface 256 kept in contact with one respective side surface of the rail 11 of the linear roller guideway 1. Thus, the nonlinear component 2 is precisely coupled to the rail 11.

Figure 13:
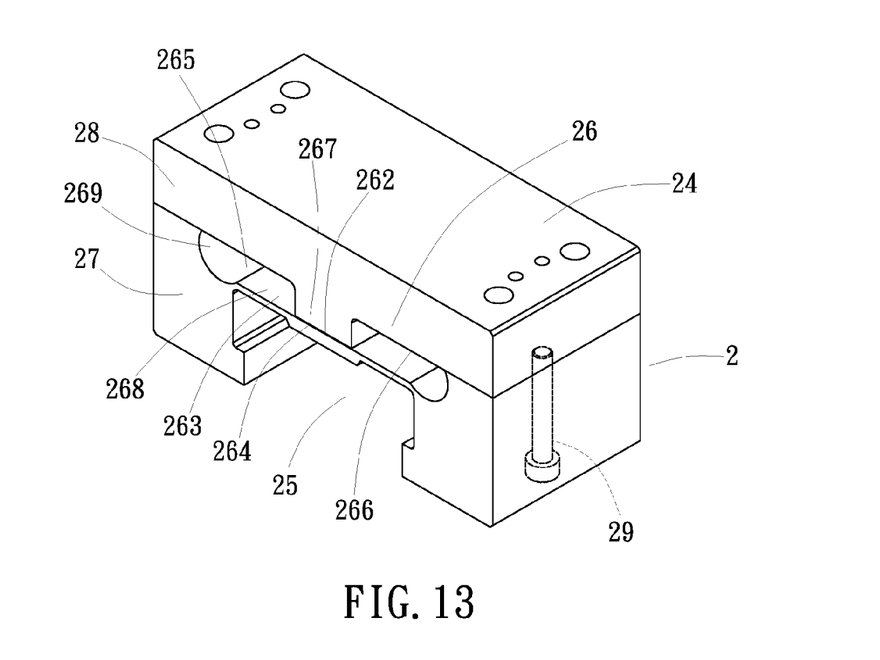
FIG. 13 is an oblique top view of a nonlinear component of a fourth embodiment of the present invention.
Figure 14:
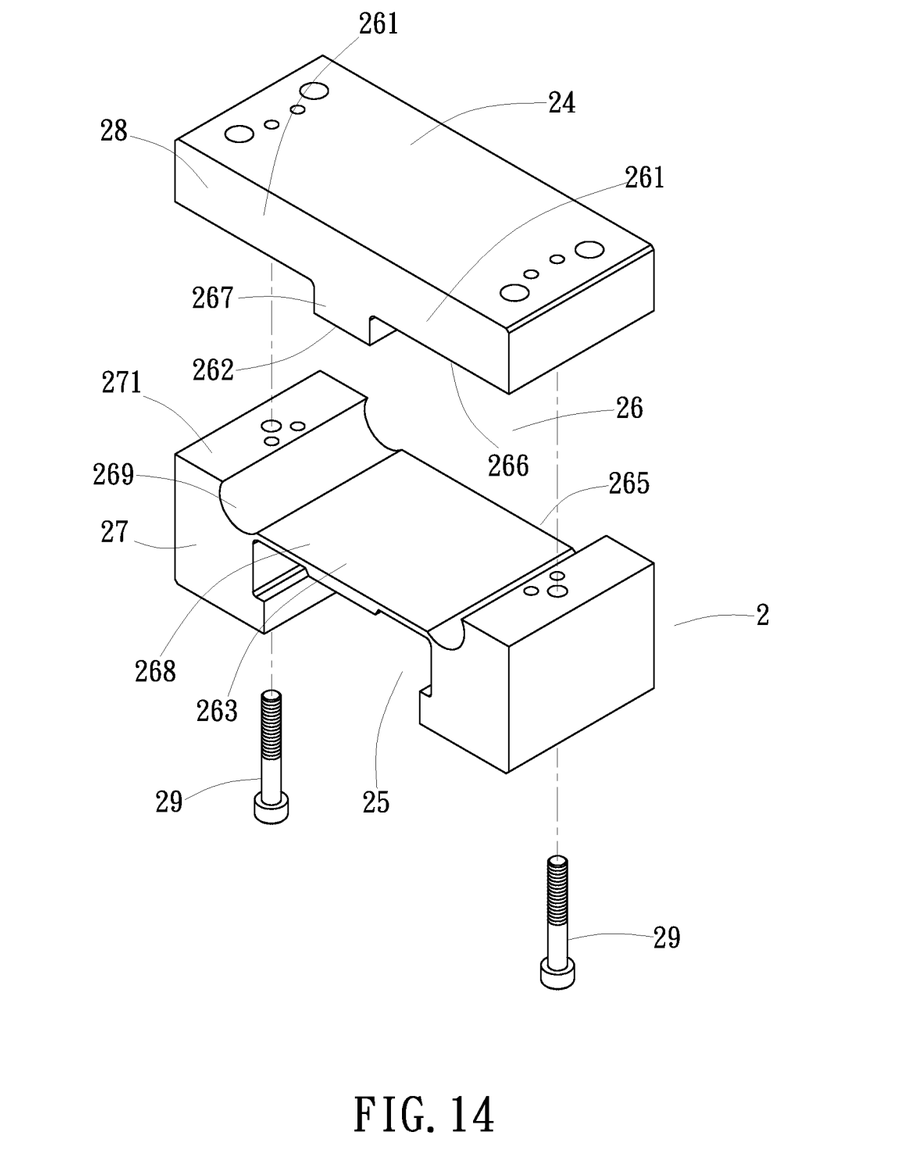
FIG. 14 is an exploded view of the nonlinear component of the fourth embodiment of the present invention.

The aforesaid nonlinear component 2 is preferably a one-piece metal block of rectangular form that defines the said bearing surface 24, the said sliding groove 25 and the said hardening contact structure 26. Alternatively, as shown in FIGS. 13 and 14, the nonlinear component 2 can be implemented as a modular structure, consisting of a first block member 27 and a second block member 28. The top wall 271 of the first block member 27 is downwardly processed to form the inner bottom wall 268 and through holes 269 of the pass-through portion 265, allowing the inner bottom wall 268 to work as the high-stiffness second support surface 263. The bottom side of the first block member 27 is processed to provide the aforesaid sliding groove 25. The second block member 28 is affixed to the top wall 271 of the first block member 27 with fastening elements 29, for example, screws. The bottom wall of the second block member 28 works as the inner top wall 266 of the said pass-through portion 265, and is processed to provide the said first protruding block 267 having the said high-stiffness first support surface 262. After the first block member 27 and the second block member 28 are assembled, the allowable clearance 264 is defined between the high-stiffness first support surface 262 and the high-stiffness second support surface 263. Preferably, this allowable clearance 264 is in the range of 0.05 mm~0.1 mm.

Referring to the simplified curve of surface contact having a nonlinear contact characteristic of hardening of FIG. 5, the structural characteristics of the low-stiffness deformable portion 261 and allowable clearance 264 of the hardening contact structure 26 of the nonlinear component 2 enable the nonlinear component 2 and the rail 11 to achieve a soft contact or a contact of lower stiffness, facilitating installation of the nonlinear component 2 in the rail 11, and thus no vertical load or only a small amount of vertical load will be produced when mounting the nonlinear component 2 on the rail 11, and the nonlinear component 2 can be smoothly moved on the rail 11 and then quickly positioned in the desired position without incurring any significant damping force. More specifically, before the vertical load on the nonlinear component 2 reaches the stiffness of the low-stiffness deformable portion 261, the status of the low-stiffness deformable portion 261 is in the slope of the OB section.

However, in a machining operation, the vertical load is transferred from the work platform 3 through the nonlinear component 2 to the hardening contact structure 26, the at least one low-stiffness deformable portion 261 is firstly elastically deformed. The stiffness of the low-stiffness deformable portion 261 is a rated stiffness value. Thus, when the amount of deformation reaches the predetermined stiffness value and the amount of deformation of the low-stiffness deformable portion 261 surpasses the predetermined stiffness value, the high-stiffness first support surface 262 is lowered to reduce the allowable clearance 264. When the allowable clearance 264 is reduced to the extent that the high-stiffness first support surface 262 touches the high-stiffness second support surface 263, the stiffness of the nonlinear component 2 is largely increased, achieving the surface contact characteristic of nonlinear of bilinear.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for improving the dynamic characteristics of a linear roller guideway comprising a rail, a plurality of slide units, and a plurality of rolling elements set in between said rail and each said slide unit, said method comprising: slidably mounting a nonlinear component on said rail of said linear roller guideway between each two adjacent said slide units of said linear roller guideway for working with said slide units to bear a vertical load from a work platform in such a manner that the contact between said nonlinear component and said rail of said linear roller guideway has a nonlinear contact characteristic of hardening so that when said nonlinear component is being mounted on said rail or when said nonlinear component carries no load, the contact between said nonlinear component and said rail is a soft contact; when said nonlinear component bears a load exceeding a predetermined value, the contact between said nonlinear component and said rail hardens so as to sustain higher load per unit of deformation of said nonlinear component relative to said soft contact.

2. The method as claimed in claim 1, comprising the steps of:
   (a) establishing a stiffness curve for said nonlinear contact characteristic of hardening for the contact between said nonlinear component and said rail of said linear roller guideway;
   (b) defining a low stiffness region and a high stiffness region according to the stiffness curve from step (a), and then determining a stiffness value of said nonlinear component between said low stiffness region and said high stiffness region; and
   (c) designing a nonlinear component having said nonlinear contact characteristic of hardening corresponding to the stiffness curve from step (a) and step (b).

3. The method as claimed in claim 2, wherein said low stiffness region is elastically deformed prior to said high stiffness region when bearing a vertical load; said high stiffness region is gradually elastically deformed and moved toward said rail of said linear roller guideway as said low stiffness region is deformed, said high stiffness region comprising a contact surface for contacting said rail directly or indirectly.

4. The method as claimed in claim 3, wherein said nonlinear contact characteristic of hardening means that when said nonlinear component receives a load, the relationship between the load and the amount of deformation has a nonlinear contact characteristic of hardening, satisfying the condition that increasing the amount of deformation needs to increase the load.

5. The method as claimed in claim 3, wherein said nonlinear contact characteristic of hardening is represented by multiple lines in the stiffness curve.

6. The method as claimed in claim 5, wherein said nonlinear component is an additional member mounted in said linear roller guideway between two said slide units of said linear roller guideway and slidably mounted on said rail of said linear roller guideway, the relative movement between said nonlinear component and said rail being a sliding motion between contact surfaces, the contact characteristic of the contact between said nonlinear component and said rail meeting the nonlinear contact of hardening.

7. A structure for improving the dynamic characteristics of a linear roller guideway, comprising a nonlinear component mountable on a rail of a linear roller guideway, said nonlinear component comprising a bearing surface located at a top side thereof, a sliding groove located in a bottom side thereof and fitting said rail, and a hardening contact structure disposed between said sliding groove and said bearing surface, said hardening contact structure comprising at least one low-stiffness deformable portion elastically deformable with a vertical load being applied to said bearing surface, a high-stiffness first support surface movable downwards with said vertical load being applied to said bearing surface, a high-stiffness second support surface corresponding to said high-stiffness first support surface, and an allowable clearance defined between said high-stiffness first support surface and said high-stiffness second support surface.

8. The structure as claimed in claim 7, wherein said allowable clearance is in the range of 0.05 mm~0.1 mm.

9. The structure as claimed in claim 8, wherein said hardening contact structure further comprises a pass-through portion extending through opposing front and rear sides of said nonlinear component, said pass-through portion defining an inner top wall and an opposing inner bottom wall, said inner bottom wall forming said high-stiffness second support surface, a first protruding block downwardly extending from said inner top wall of said pass-through portion and terminating in said high-stiffness first support surface.

10. The structure as claimed in claim 9, wherein said hardening contact structure further comprises two through holes defined in two opposite lateral sides in said pass-through portion and in communication with said pass-through portion, the diameter of said through holes being larger than the height between said inner top wall and said inner bottom wall of said pass-through portion such that the part of said hardening contact structure between said through holes and said bearing surface and the part of said hardening contact structure between said inner top wall and said bearing surface form said low-stiffness deformable portion.

11. The structure as claimed in claim 10, wherein the thickness of the part of said hardening contact structure between said through holes and said bearing surface is smaller than the thickness of the part between said inner top wall and said bearing surface.

12. The structure as claimed in claim 11, wherein said sliding groove comprises a top groove wall, two opposite side groove walls, a second protruding block downwardly extending from said top groove wall and terminating in a first sliding surface for contacting a top surface of said rail, and two third protruding blocks respectively extended from said two side groove walls toward a vertical midline thereof, each said third protruding block comprising a second sliding surface for contacting one respective side surface of said rail.

13. The structure as claimed in claim 12, wherein said nonlinear component further comprises a first block member and a second block member, said first block member comprising a top wall curved downwards and having said inner bottom wall and said through holes of said pass-through portion defined therein and a bottom side defining said sliding groove, said second block member being affixed to said top wall of said first block member and having said first protruding block formed in a bottom side thereof.

\* \* \* \* \*